Patented Feb. 23, 1932

1,846,121

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

BROMO-N-BENZANTHRONEPYRAZOLANTHRONES

No Drawing. Application filed April 24, 1930, Serial No. 447,109, and in Germany April 27, 1929.

The present invention relates to the production of brominated N-benzanthronepyrazolanthrones.

We have found that bromo derivatives of N-benzanthronepyrazolanthrones, which dye the fibre in very valuable usually green blue shades, are obtained in a simple manner which is easy to carry out industrially, by treating N-benzanthronepyrazolanthrone or its derivatives or isomers with bromine or agents supplying bromine in inorganic diluting media and preferably in the presence of halogenating catalysts as for example metals, metal salts or non-metals, such as for example mercury, nickel, iron, manganese, antimony and compounds thereof, or iodine, sulphur, selenium and phosphorus. N-benzanthronepyrazolanthrones may be produced by condensing a Bz 1-halogenbenzanthrone with a pyrazolanthrone, preferably in an organic diluent in the presence of an acid-binding agent and a condensing catalyst, such as copper, and subjecting the product thus obtained to alkaline condensation. The dyestuffs thus obtainable differ substantially from the non-halogenated initial materials in that they have a considerably higher tinctorial power and a shade which is usually changed appreciably towards green and is therefore especially valuable.

Inorganic solvents or suspending media suitable for the purpose of the present invention comprise, for example, sulphuric acid and derivatives thereof, such as chlorosulphonic acid and oleum, melts of anhydrous metal halides, in particular metal chlorides, to which substances lowering the melting point of the metal halides, for example alkali or alkaline earth metal halides, may be added. Since chlorosulphonic acid and some of the metal chlorides part with chlorine at elevated temperatures, as is the case with chlorosulphonic acid at temperatures above about 70° C. and with for example aluminum chloride at temperatures above about 150° C. and with iron chloride above about 100° C., the bromination when carried out in the said suspending media yields at elevated temperatures products containing bromine and chlorine simultaneously.

The shade, the bromine content and in some cases the ratio of bromine and chlorine in the molecule are determined by the halogen transferrer and the reaction temperatures employed as well as by the initial materials, which latter may themselves contain chlorine, bromine or iodine if desired. Generally speaking reaction products giving the most greenish dyeings are obtained at the lower temperatures. Particularly greenish dyestuffs are obtained by the treatment of N-benzanthronepyrazolanthrone with bromine in chlorsulphonic acid at about 40° C. while employing iodine or mercury as the transferrer, whereas reaction products which give somewhat less greenish dyeings are obtained at higher temperatures as for example at from 60° to 65° C. or by employing other catalysts as for example antimony or bismuth.

The dyestuffs containing bromine, or bromine and chlorine or iodine, or all three halogens in the molecule thus obtained usually dissolve in concentrated sulphuric acid giving violet colorations, give green blue vats and usually dye cotton greenish marine blue shades having excellent properties of fastness. In addition they are valuable intermediate products for the manufacture of new dyestuffs. The corresponding leuco esters or leuco preparations may be easily obtained from the dyestuffs according to the usual methods.

The crude dyestuffs may be purified if necessary by the usual methods as for example by crystallization from or boiling up with solvents of high boiling point or by crystallization from sulphuric acid by way of the oxonium sulphate or by treatment with oxidizing agents as for example by treatment in the form of their aqueous pastes with alkali or alkaline earth metal hypochlorites.

The following examples will further illustrate the nature of this invention, but the invention is not restricted to these examples. The parts are by weight.

Example 1

45 parts of N-benzanthronepyrazolanthrone are dissolved in 450 parts of chlorsulphonic acid while stirring. After the addition of 4 parts of iodine and 16 parts of bromine the whole is heated to 40° C. and is kept at this temperature until all the bromine has been used up. The whole is then allowed to cool if necessary diluted with concentrated sulphuric acid, poured into water, boiled for a short time and the precipitate filtered off from the hot reaction mixture. The dyestuff, a dibromo-N-benzanthronepyrazolanthrone thus obtained is a green blue paste which is a blue powder when dried. It dissolves in concentrated sulphuric acid giving a violet coloration, gives a blue vat from which cotton is dyed powerful clear navy blue shades with a greenish tinge of excellent fastness, and in particular of excellent fastness to light and weather and of practically complete fastness to drops of water. In contradistinction thereto the unhalogenated initial material furnishes dyeings having no greenish tinge and the dibromo derivative produced by bromination in organic solvents yields dyeings with a more reddish tinge than the unhalogenated initial material.

A dyestuff containing chlorine and bromine which gives dyeings which are less green than the dyestuff containing bromine alone obtained at 40° C. is obtained by subsequently raising the temperature.

Example 2

A solution of 45 parts of N-benzanthronepyrazolanthrone in 450 parts of chlorosulphonic acid is heated slowly to 60° C. after the addition of 4 parts of mercury and 35 parts of bromine, and is kept at this temperature until the greater part of the bromine has been used up. The whole is then allowed to cool and is worked up as described in Example 1. The reaction product obtained, which is a green blue paste, dyes cotton clear powerful green blue shades of very good fastness from a blue vat.

Reaction products having similar tinctorial properties are obtained by employing other metallic catalysts as for example arsenic, antimony and the like.

Example 3

45 parts of N-benzanthronepyrazolanthrone are dissolved in a mixture of 100 parts of sulphuric acid monohydrate and 350 parts of chlorosulphonic acid, 2 parts of selenium and 35 parts of bromine are added and the temperature is raised to from 60° to 65° C. The whole is kept at the same temperature until the greater part of the bromine has been used up. It is then allowed to cool and is worked up in the usual manner. The dyestuff obtained, which is a green blue paste and a blue powder when dried, dissolves in concentrated sulphuric acid giving a violet coloration, gives a blue vat and yields similar dyeings to the dyestuff obtainable according to Example 2.

A mixture of oleum and chlorsulphonic acid may be employed as the solvent instead of the mixture of monohydrate and chlorsulphonic acid. The selenium may be replaced by other non-metals as for example by sulphur.

Example 4

44.5 parts of pure N-benzanthronepyrazolanthrone (obtained by crystallization of crude N-benzanthronepyrazolanthrone from sulphuric acid by way of oxonium sulphate) in 500 parts of concentrated sulphuric acid are heated to from 80° to 85° C. while stirring after the addition of 1.4 parts of iodine and 40 parts of bromine. As soon as the bromine has disappeared the whole is allowed to cool, poured into water, and the reaction product which separates in the form of a blue flocculent precipitate is filtered by suction. It is a bromo-N-benzanthronepyrazolanthrone which dissolves in concentrated sulphuric acid giving a violet coloration and dyes cotton fast navy blue shades from a blue vat.

Example 5

44.5 parts of N-benzanthronepyrazolanthrone are dissolved in 400 parts of oleum containing about 7 per cent of $SO_3$. 2 parts of iodine and 20 parts of bromine are added and the temperature is slowly raised to from 35° to 40° C. and the whole is stirred until all the bromine has been taken up. The whole is then allowed to cool and is diluted with 50 per cent sulphuric acid until the oxonium sulphate separated out and the latter is then filtered by suction. After decomposing this with water the reaction product is obtained as a blue paste, by analysis a dibromo-N-benzanthronepyrazolanthrone, which dissolves in concentrated sulphuric acid giving a violet coloration and yields greenish navy blue dyeings of excellent fastness on cotton.

A dichlorodibromo-N-benzanthronepyrazolanthrone is obtained in an analogous manner from dichloro-N-benzanthronepyrazolanthrone.

Example 6

44.5 parts of N-benzanthronepyrazolanthrone are introduced at from 120° to 130° C. while stirring into a melt of 200 parts of aluminium chloride and 40 parts of common salt. After the addition of 2 parts of iodine, 40 parts of bromine are added drop by drop and the whole is kept at from 125° to 130° C. until all the bromine has been used up and the whole is then poured into dilute acid and filtered by suction. The dyestuff obtained, which is a bromo-N-benzanthronepyrazolanthrone is a green blue paste and a blue powder when dried and it dissolves in concentrated sulphuric acid giving a violet coloration and gives greenish navy blue shades of excellent fastness to drops of water on the vegetable fibre from a green blue vat, similar to the dyeings obtained with the dyestuff obtainable according to Example 5. The yield is quantitative.

Other solvents or suspending agents as for example a melt of iron chloride and common salt may be employed instead of the melt of aluminium chloride and common salt. In this case other halogens, as for example chlorine from the metal chloride, frequently enter into the dyestuff molecule in addition to bromine.

*Example 7*

45 parts of N-benzanthronepyrazolanthrone are dissolved while stirring in 450 parts of chlorosulphonic acid, whereupon 0.5 part of iodine and 10 parts of bromine are added and the reaction mixture is heated to 40° C. and kept thereat until all of the bromine has been used up. The reaction mixture is then allowed to cool and worked up as usual. The dyestuff thus obtained containing about 1 atom of bromine according to analysis is a blue powder dissolving in concentrated sulphuric acid to give a violet solution and dyes cotton from a blue vat navy blue shades of good fastness properties.

*Example 8*

445 parts of N-benzanthronepyrazolanthrone are dissolved at between 10° and 15° C. in 4400 parts of chlorosulphonic acid while stirring, the reaction mixture being then heated at between 65° and 70° C. after the addition of 15 parts of iodine and 445 parts of bromine until the bulk of the bromine is consumed. The reaction mixture is then allowed to cool and worked up in the usual manner. The tribromodichloro-N-benzanthronepyrazolanthrone thus obtained in an excellent yield is a violet blue powder, dissolves in oleum to give a violet solution and is only difficultly soluble in an alkaline hydrosulphite solution.

*Example 9*

45 parts of N-benzanthronepyrazolanthrone are introduced while stirring at between 20° and 30° C. into a suspension of 4 parts of iodine and 50 parts of bromine in 450 parts of oleum of 23 per cent strength. The reaction mixture is kept for several hours at between 40° and 50° C. and then worked up in the usual manner. The product thus obtained in an excellent yield in the form of a dark blue powder is a tetra-bromo derivative according to anaylsis and forms a valuable intermediate product for the preparation of dyestuffs due to its reactivity.

What we claim is:

1. A process of producing brominated N-benzanthronepyrazolanthrones, which comprises treating a N-benzanthrone-pyrazolanthrone with a brominating agent in an inorganic diluting medium free from nitrogen.

2. A process of producing brominated N-benzanthrone-pyrazolanthrones, which comprises treating a N-benzanthrone-pyrazolanthrone with a brominating agent in an inorganic diluting medium free from nitrogen in the presence of a halogenating catalyst.

3. A process of producing brominated N-benzanthrone-pyrazolanthrones, which comprises treating a N-benzanthrone-pyrazolanthrone with bromine in chlorosulphonic acid.

4. A process of producing brominated N-benzanthrone-pyrazolanthrones, which comprises treating a N-benzanthrone-pyrazolanthrone with bromine in chlorosulphonic acid at about 40° C.

5. A process of producing brominated N-benzanthrone-pyrazolanthrones, which comprises treating a N-benzanthrone-pyrazolanthrone with bromine in chlorosulphonic acid at about 40° C. in the presence of iodine.

6. As a new article of manufacture dibromo-N-benzanthrone-pyrazolanthrone forming a green blue paste and a blue powder when dried, dissolving in concentrated sulphuric acid giving a violet coloration and dyeing cotton clear blue shades with a more greenish tinge than N-benzanthronepyrazolanthrone from a blue vat.

7. A process of producing brominated N-benzanthrone-pyrazolanthrones, which comprises treating a N-benzanthrone-pyrazolanthrone with a brominating agent in an inorganic diluting medium free from nitrogen and inert to the parent materials under the reaction conditions obtaining.

8. A process of producing brominated N-benzanthrone-pyrazolanthrones, which comprises treating a N-benzanthrone-pyrazolanthrone with a brominating agent in an inorganic diluting medium free from nitrogen and inert to the parent materials under the reaction conditions obtaining and in the presence of a halogenating catalyst.

In testimony whereof we have hereunto set our hands.

MAX ALBERT KUNZ.
KARL KOEBERLE.
ERICH BERTHOLD.